Jan. 23, 1968   F. R. COLLINS, JR., ET AL   3,364,960
SAW SUPPORTING AND GUIDING APPARATUS
Filed Nov. 30, 1965   2 Sheets-Sheet 1

INVENTORS
FREDERICK R. COLLINS, JR.
RAYMOND M. CURRAN
RICHARD GARRAHAN

ATTYS.

Jan. 23, 1968  F. R. COLLINS, JR., ET AL  3,364,960
SAW SUPPORTING AND GUIDING APPARATUS
Filed Nov. 30, 1965  2 Sheets-Sheet 2

INVENTORS
FREDERICK R. COLLINS, JR,
RAYMOND M. CURRAN
RICHARD GARRAHAN

Harvey A. David
ATTYS.

United States Patent Office 3,364,960
Patented Jan. 23, 1968

3,364,960
SAW SUPPORTING AND GUIDING APPARATUS
Frederick R. Collins, Jr., 4326 Bowen Road, SE., Washington, D.C. 20019; Raymond M. Curran, 1310 California St., Woodbridge, Va. 22191, and Richard Garrahan, 118 Shoshone Drive, Forest Heights, Md.
Filed Nov. 30, 1965, Ser. No. 510,712
10 Claims. (Cl. 143—32)

The invention described herein may be manufactured and used by or for the Government of the United States of America for governmental purposes without the payment of any royalties thereon or therefor.

This invention relates to an improved power saw supporting and guiding apparatus for use in cutting upright members, and more particularly to such an apparatus which is particularly useful in cutting underwater pilings or the like.

Heretofore, the cutting of underwater pilings has required the use of one or more divers who would descend to the desired cutting locating and manipulate a saw to cut off a piling. This of course involves the requirement of skilled divers and their tenders, costly diving equipment, and involved an inordinate amount of time and labor as well as being a somewhat hazardous undertaking.

With the foregoing in mind, it is a principal object of this invention to provide an improved power saw supporting and guiding apparatus by which a saw can be manipulated entirely from above the surface of water to sever pilings underwater in a safe, economical and expeditious manner and without requiring unusually skilled personnel.

It is another object of this invention to provide a power saw supporting and guiding apparatus which is easily adjusted to accommodate pilings to be cut or other upright members of various cross-sectional shapes and sizes, which can be remotely operated to securely clamp itself to a piling at a selected height, and can be remotely operated to cause a saw supported by the apparatus to make a guided cut through the piling.

Other objects and many of the attendant advantages of this invention will be readily appreciated as the same becomes better understood by reference to the following detailed description when considered in connection with the accompanying drawings wherein.

Figure 1:
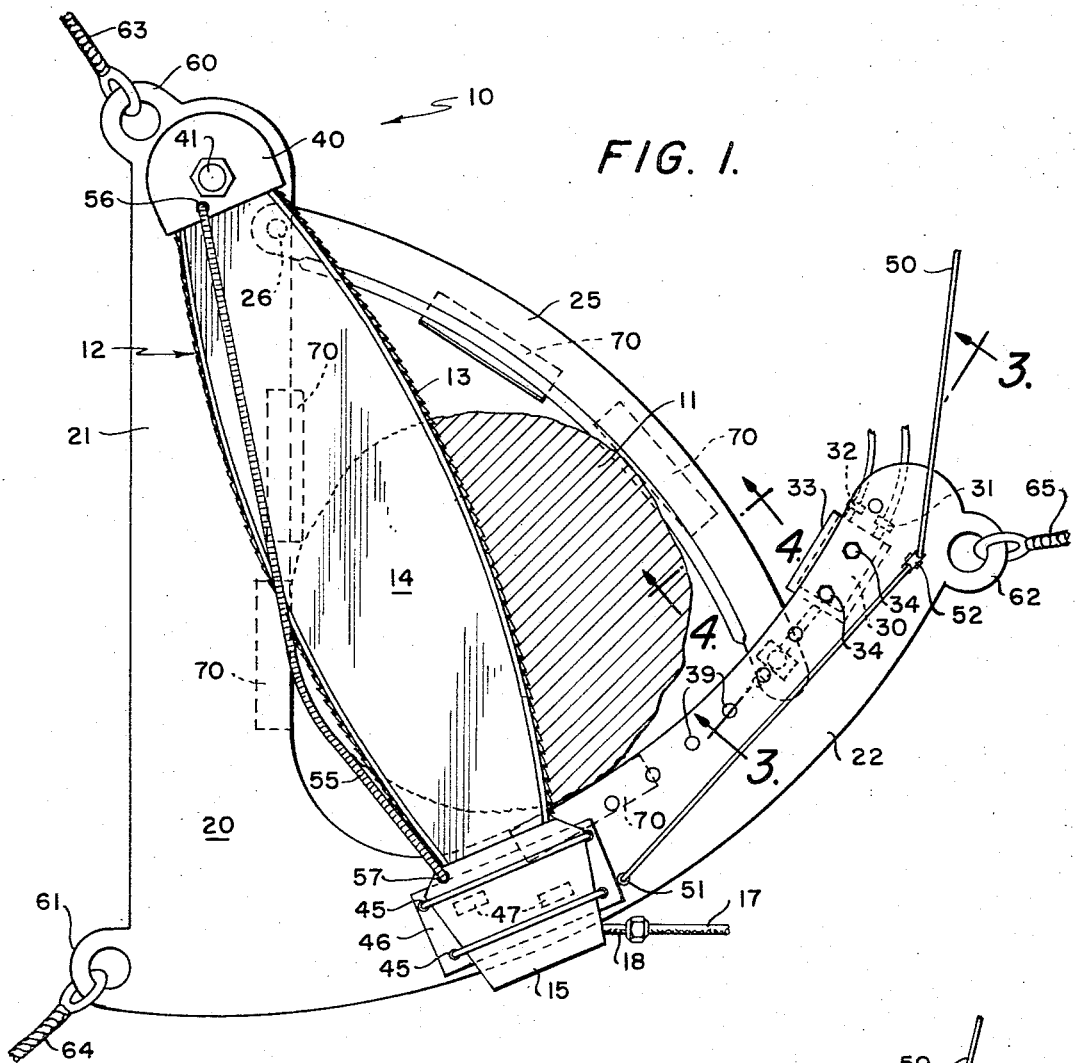
FIG. 1 is a top plan view of a saw supporting and guiding apparatus embodying the present invention.
Figure 2:
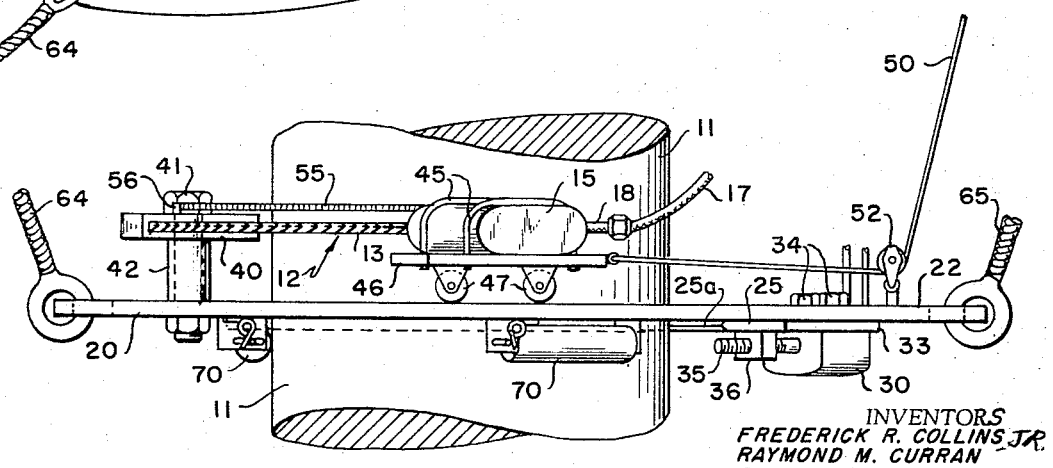
FIG. 2 is a front elevation of the apparatus of FIG. 1.

In the form of the invention illustrated in the drawings and described hereinafter, there is provided a saw supporting and guiding apparatus, generally indicated at 10, which is particularly useful in the task of cutting-off of underwater pilings or the like, one such piling being indicated at 11. The apparatus 10 is shown in association with an elongated power saw 12 of the type generally known as a "chain saw" and which includes an endless, flexible cutting element 13 which is driven around the periphery of an elongated track member 14 by a power head 15 at one end of the track member.

In the present example the saw 12 comprises a pneumatically actuated power head 15 which can be operated in a submerged condition and the operation of which can be remotely controlled from above the surface of the water by controlling the supply of pressurized air to the power head through a suitable flexible hose 17 attached to an air inlet fitting 18 of the power head.

It will be understood, of course, that the saw per se forms no part of the invention and that the apparatus 10 may be used with other chain saws such as those which are electrically powered and suitably insulated.

The apparatus 10 comprises a base plate 20 having first and second arm portions 21 and 22 which extend from a common origin in a somewhat V-shaped configuration and are adapted to partially embrace a piling 11 or other member to be sawn. It will be noted that in the preferred embodiment shown, the arm portion 21 is straight while the arm portion 22 is arcuate.

Figure 3:
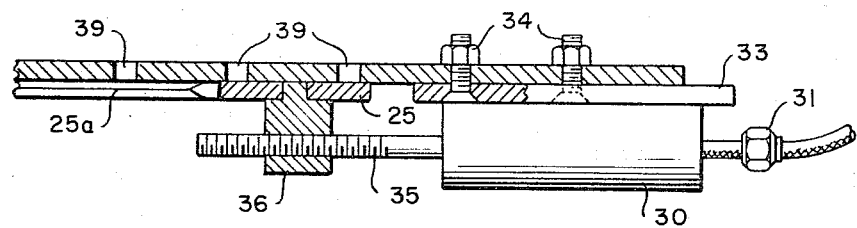
FIG. 3 is an enlarged sectional view of a portion of the apparatus taken substantially along line 3—3 of FIG. 1.

A clamping bar 25 has one end thereof connected by suitable pivot means 26 to the outer end of the arm portion 21 and spans the space between the arm portions. The other end of the clamping bar 25 is adapted to be moved along the arcuate arm portion 22 by remotely controlled drive means so as to tightly clamp a piling 11 embraced by the arm portions and the clamping bar. To this end, and as is best illustrated in FIG. 3, a reversible, pneumatically operated motor 30 having air hose fittings 31, 32 and a mounting plate 33 is secured by bolts 34 to the underside of the arm portion 22. The motor 30 has as its output shaft a rotary screw 35 which is in threaded engagement with a nut member 36. The nut member 36 is pivotally connected at 38 to the movable end of the clamping bar 25.

It will be recognized that actuation of the pneumatic motor 30 to effect one direction of rotation of screw 35 will cause the nut member 36 to run along the screw so as to drive the clamping bar 25 toward the piling 11 and into clamping or gripping relation therewith. Actuation of the motor 30 in the opposite direction will retract the clamping bar 25 from engagement with the piling. The arm portion 22 is conveniently provided with a plurality of bolt holes 39 spaced therealong, whereby the motor 30 and its mounting plate may be adjustably positioned along the arm poriton to accommodate pilings 11 of different sizes.

The saw 12 has the end 40 thereof, which is remote from the power head 15, pivoted to the outer end of the arm portion 21 as by a pivot bolt 41 and suitable spacer sleeve 42. The power head 15 is secured by suitable fastening means or bands 45 to a carriage 46 which rides on staggered wheels 47 in an accurate path along the arm portion 22.

The carriage is movable along the arm portion 22 to provide swinging movement of the saw 12 about the pivot 41 from an initial position in overlying alignment with the arm portion 21, through an intermediate position as shown in FIG. 1, to effect cutting of the piling 11. Such movement of the carriage and saw may be remotely effected through the agency of a pull rope or line 50 which is connected at one end 51 to the carriage 46 and is led through a sheave 52 at the outer end of arm portion 22 to an operator above the surface of the water.

It has been found that in order to provide a surety and fineness of control of the saw advancement during cutting, as well as to permit "backing up" of the saw in the cut, it is advantageous to provide an extension spring 55 which resiliently opposes advancement of the saw, especially during latter portions of a cut.

The spring 55, which is a coil type extension spring, is connected at one end to a post 56 on the end 40 of the saw, and is connected at its other end to a post 57 on the power head 15. The spring is adapted to engage the piling and be resiliently stretched as the saw advances as shown in FIG. 1.

The base plate 20 is conveniently provided with three eyes 60, 61 and 62 to which lowering lines 63, 64 and 65 are connected for use in lowering the apparatus 10, with the saw 12 in place and aligned with arm 21, down along a piling embraced loosely by the arm portions 21, 22 and the clamping bar 25. In order to facilitate lowering of the apparatus along a piling, and to obviate the likelihood of binding, the apparatus 10 comprises a plurality of spring biased rollers 70, two of which are located on the arm portion 22, two of which are located on the clamping bar 25, and one of which is on the arm portion 21. Inasmuch as all of the rollers 70 are supported and biased in a like manner, only one will be described with reference to FIGS. 4 and 5. In those views, the roller 70 is seen to comprise an axle 71 the ends of which project through slots 72 in depending end plates 73. Springs 75 urge the ends of the axle 71, and hence the roller 70, in a direction toward the piling 11.

Figure 4:
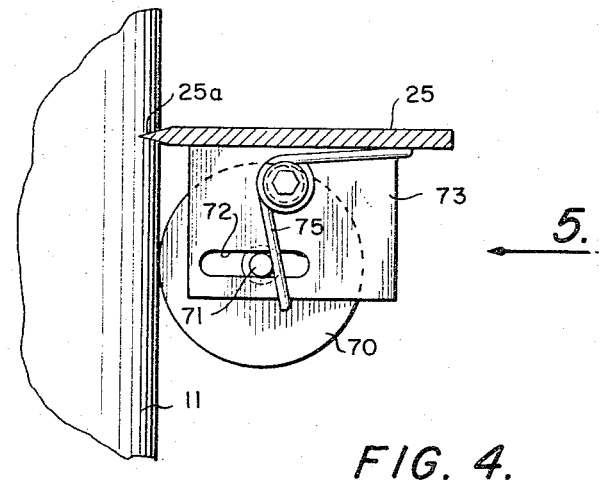
FIG. 4 is an enlarged sectional view of a portion of the apparatus taken substantially along line 4—4 of FIG. 1.
Figure 5:
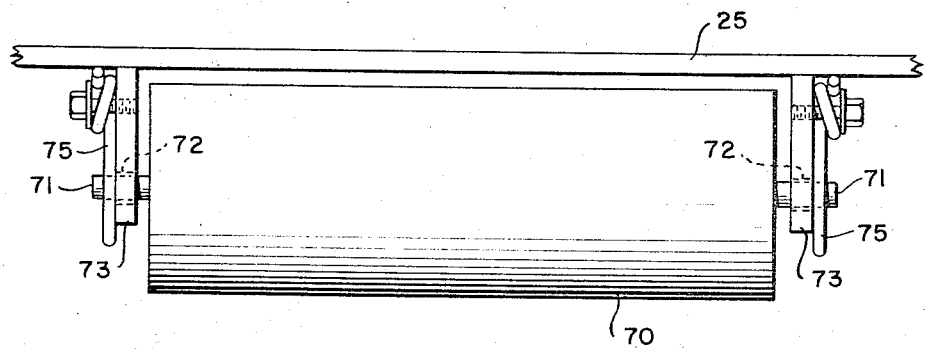
FIG. 5 is a side elevational view of the portion of the apparatus illustrated in FIG. 4 viewed in the direction of the arrow 5.

During lowering of the apparatus by lines 63, 64 and 65 down a piling, the rollers project inwardly of the edges of the base plate 20 and clamping arm and assure smooth travel of the apparatus. When the motor 30 is actuated to drive the bar 25 into clamping relation to the piling, the rollers 70 are displaced as shown in FIG. 4 by the piling which is firmly gripped by the bar 25 and arm portions 21, 22 of the base plate.

The pile engaging edge 25a of the clamping bar 25 is preferably sharpened somewhat to enhance the grip of the apparatus on the piling. Similarly, the inner edges of the arm portions 21 and 22 may be sharpened, although they are not so illustrated.

From the foregoing detailed description of a preferred saw guiding and supporting apparatus embodying the invention it will be appreciated that the invention achieves the previously stated objects and advantages as well as others apparent from the description.

Obviously many modifications and variations of the present invention are possible in the light of the above teachings. It is therefore to be understood that within the scope of the appended claims the invention may be practiced otherwise than as specifically described.

What is claimed is:
1. Apparatus for supporting and guiding a saw for use in cutting upright members, said apparatus comprising:
   a base plate having first and second arm portions extending from a common origin and adapted to partially embrace an upright member to be cut;
   a clamping bar spanning said arm portions and having one end pivoted to one of said arm portions;
   power operable drive means on the other of said arm portions and operative on the other end of said clamping bar to effect movement thereof along said other of said arm portions for clamping said apparatus to an upright member when embraced by said arm portions and said clamping bar;
   pivot means at the outer end of one of said arm portions for pivotally connecting thereto one end of an elongated saw;
   a carriage secured to the other end of said elongated saw and supported for movement along the other of said arm portions in an accurate path about said pivot means.

2. Apparatus as defined in claim 1 and wherein said drive means is reversible in operation and is adjustably positionable along the arm portion on which it is mounted.

3. Apparatus as defined in claim 1 and further comprising:
   actuating means connected to said carriage for effecting said movement thereof.

4. Apparatus as defined in claim 1 and further comprising:
   roller means mounted on one or more of said arm portions and said clamping bar, said roller means being resiliently biased toward positions for making rolling engagement with an upright member and holding said arm portions and clamping bar out of engagement with said member, said roller means being displaceable from said positions upon operation of said drive means to bring said clamping bar into clamping engagement with said upright member.

5. Apparatus as defined in claim 1 and further comprising:
   spring means operative to resiliently oppose said movement of said carriage.

6. Apparatus as defined in claim 1 and wherein:
   said first arm portion is straight;
   said pivot means is at the outer end of said first arm portion; and
   said second arm portion is arcuate.

7. Apparatus as defined in claim 6 and wherein:
   said drive means comprises a reversible pneumatic motor and is adjustably positionable along said second arm portion.

8. Apparatus as defined in claim 7 and further comprising:
   actuating means connected to said carriage and said second arm portion for effecting movement of said carriage along said second arm portion.

9. Apparatus as defined in claim 8 and further comprising:
   roller means mounted on one or more of said arm portions and said clamping bar, said roller means being resiliently biased toward positions for making rolling engagement with an upright member and holding said arm portions and clamping bar out of engagement with said member, said roller means being displaceable from said positions upon operation of said drive means to bring said clamping bar into clamping engagement with said upright member.

10. Apparatus as defined in claim 9 and further comprising:
    spring means operative to resiliently oppose said movement of said carriage.

References Cited

UNITED STATES PATENTS

| | | | |
|---|---|---|---|
| 782,101 | 2/1905 | Blaisdell | 144—34 |
| 2,846,175 | 8/1958 | Sexton | 144—34 X |
| 3,252,487 | 5/1966 | Larson et al. | 144—34 X |

DONALD R. SCHRAN, *Primary Examiner.*